United States Patent
Lee et al.

(10) Patent No.: US 12,352,969 B2
(45) Date of Patent: Jul. 8, 2025

(54) DISPLAY APPARATUS INCLUDING COMBINER HAVING ASYMMETRIC MAGNIFICATION

(71) Applicants: SAMSUNG ELECTRONICS CO., LTD., Suwon-si (KR); MYONGJI UNIVERSITY INDUSTRY AND ACADEMIA COOPERATION, Yongin-si (KR)

(72) Inventors: Changkun Lee, Seoul (KR); Woojun Han, Seoul (KR); Jaisoon Kim, Anyang-si (KR); Seokil Moon, Suwon-si (KR); Geeyoung Sung, Daegu (KR); Seunga Lim, Incheon (KR)

(73) Assignees: SAMSUNG ELECTRONICS CO., LTD., Suwon-si (KR); MYONGJI UNIVERSITY INDUSTRY AND ACADEMIA COOPERATION, Yongin-si (KR)

( * ) Notice: Subject to any disclaimer, the term of this patent is extended or adjusted under 35 U.S.C. 154(b) by 628 days.

(21) Appl. No.: 17/700,775

(22) Filed: Mar. 22, 2022

(65) Prior Publication Data
US 2022/0299776 A1 Sep. 22, 2022

(30) Foreign Application Priority Data
Mar. 22, 2021 (KR) .................. 10-2021-0036755

(51) Int. Cl.
*G02B 27/01* (2006.01)
*G02B 6/34* (2006.01)

(52) U.S. Cl.
CPC .......... *G02B 27/0172* (2013.01); *G02B 6/34* (2013.01); *G02B 2027/013* (2013.01); *G02B 2027/0178* (2013.01)

(58) Field of Classification Search
CPC .......... G02B 27/0172; G02B 2027/013; G02B 2027/0178; G02B 27/4205; G02B 6/34; G02B 6/0043; G02B 27/4227
See application file for complete search history.

(56) References Cited

U.S. PATENT DOCUMENTS 6,313,942 B1 * 11/2001 Nanba ................ G02B 15/1421
359/431
9,535,249 B2 1/2017 Takeda et al.
(Continued)

FOREIGN PATENT DOCUMENTS

CN 105629478 A 6/2016
KR 10-2019-0131510 A 11/2019

OTHER PUBLICATIONS

Fang, et al. "Manufacturing and measurement of freeform optics", 2013, CIRP Annals—Manufacturing Technology, vol. 62, 24 pages total.
(Continued)

*Primary Examiner* — Mustak Choudhury
(74) *Attorney, Agent, or Firm* — Sughrue Mion, PLLC

(57) ABSTRACT

Provided is a display apparatus including a combiner having asymmetric magnification. The display apparatus may include: an image forming device configured to form a virtual image; and a combiner configured to mix the virtual image with light containing an outside landscape and provide a viewer with the virtual image and the light that are mixed with each other, wherein the combiner may include a curved surface that varies a size of the virtual image with a first magnification in a first direction and a second magnification in a second direction perpendicular to the first direction, the second magnification being less than the first magnification.

24 Claims, 13 Drawing Sheets

(56) References Cited

U.S. PATENT DOCUMENTS

| | | | |
|---|---|---|---|
| 9,804,397 B2* | 10/2017 | Schowengerdt | H04N 13/341 |
| 9,915,823 B1 | 3/2018 | Kress et al. | |
| 10,228,561 B2 | 3/2019 | Robbins et al. | |
| 10,645,374 B2* | 5/2020 | Takeda | G02B 27/017 |
| 2012/0086625 A1* | 4/2012 | Takeda | G02B 30/27 |
| | | | 345/8 |
| 2013/0050655 A1* | 2/2013 | Fujikawa | G02B 27/0101 |
| | | | 353/38 |
| 2017/0184854 A1 | 6/2017 | Takagi et al. | |
| 2018/0088338 A1 | 3/2018 | Yoshida | |
| 2019/0265468 A1* | 8/2019 | Hirata | G02B 27/0101 |
| 2020/0166753 A1* | 5/2020 | Vallius | G02B 6/0035 |
| 2020/0386993 A1 | 12/2020 | Hua et al. | |

OTHER PUBLICATIONS

Communication issued May 27, 2022 by the European Patent Office for European Patent Application No. 21212026.5.
Communication dated May 12, 2025, issued by the European Patent Office in European Application No. 21212026.5.

* cited by examiner

DISPLAY APPARATUS INCLUDING COMBINER HAVING ASYMMETRIC MAGNIFICATION

CROSS-REFERENCE TO RELATED APPLICATION

This application is based on and claims priority under 35 U.S.C. § 119 from Korean Patent Application No. 10-2021-0036755, filed on Mar. 22, 2021, in the Korean Intellectual Property Office, the disclosure of which is incorporated by reference herein in its entirety.

BACKGROUND

1. Field

The disclosure relates to a display apparatus including a combiner having asymmetric magnification, and more particularly, to a display apparatus capable of increasing the aspect ratio of virtual image by using a combiner having asymmetric magnification.

2. Description of the Related Art

Head mounted displays providing virtual reality (VR) have been commercially available and widely used in the entertainment industry. Along with this, head mounted displays have been developed into types applicable to the fields of medicine, education, and other industries.

Augmented reality (AR) displays, which is an advanced form of VR displays, are image devices combining the real world with VR and capable of bringing out interactions between reality and VR. The interaction between reality and VR is based on the function of providing real-time information about real situations, and the effect of reality is further increased by overlaying virtual objects or information on a real-world environment.

SUMMARY

Provided are display apparatuses including combiners having asymmetric magnification.

Provided are display apparatuses capable of increasing the aspect ratio of virtual image by using combiners having asymmetric magnification.

Provided are augmented reality (AR) display apparatuses configured to provide virtual image having a large aspect ratio according to the CinemaScope standard.

Additional aspects will be set forth in part in the description which follows and, in part, will be apparent from the description, or may be learned by practice of the presented embodiments of the disclosure.

According to an aspect of the disclosure, there is provided a display apparatus including: an image forming device configured to form a virtual image; and a combiner configured to mix the virtual image with light corresponding to an outside environment and provide a viewer with the virtual image and the light that are mixed with each other, wherein the combiner includes a curved surface that changes a size of the virtual image based on a first magnification in a first direction and a second magnification in a second direction perpendicular to the first direction, the second magnification being less than the first magnification.

The combiner includes a transparent waveguide configured to transmit the virtual image, and the curved surface is formed on a surface of the transparent waveguide.

The transparent waveguide includes: a first surface and a second surface that are arranged to face each other; and a third surface and a fourth surface that are arranged between the first surface and the second surface, wherein the third surface and the fourth surface face each other, wherein the curved surface includes a first curved surface formed on the first surface and a second curved surface formed on the second surface, and wherein the third surface and the fourth surface are arranged parallel to each other to have no refractive power.

The first curved surface and the second curved surface form: in a first direction, a first principal plane at a first position along an optical axis and a first focal plane at a second position along the optical axis; and in a second direction, a second principal plane at a third position different from the first position along the optical axis and the focal plane at the second position along the optical axis.

Each of the first curved surface and the second curved surface has a width in the first direction which is less than an overall width of the combiner in the first direction.

The image forming device is arranged to provide the virtual image toward the first surface, and the first surface is arranged such that the virtual image passed through the first surface propagates into the transparent waveguide.

The image forming device is arranged to face a partial region of the third surface, and the first surface is arranged to reflect the virtual image passed through the third surface.

The image forming device is arranged to face a partial region of the fourth surface, and the first surface is arranged to reflect the virtual image passed through the fourth surface.

The combiner further includes a light-transmitting plate, the light-transmitting plate including: a fifth surface that is in contact with the second surface and has a shape complementary to the second curved surface formed on the second surface; a sixth surface that extends from the third surface; and a seventh surface that extends from the fourth surface.

The combiner further includes a transflective coating on the second surface.

The transparent waveguide includes: a first surface and a second surface that are arranged to face each other; and a third surface and a fourth surface that are arranged between the first surface and the second surface, wherein the third surface and the fourth surface face each other, and wherein the first surface is an inclined flat surface, the curved surface is formed on the second surface, and the third surface and the fourth surface are arranged parallel to each other to have no refractive power.

The combiner further includes a light-transmitting plate, the light-transmitting plate including: a fifth surface that is in contact with the curved surface and has a shape complementary to the curved surface; a sixth surface that extends from the third surface, and a seventh surface that extends from the fourth surface.

The image forming device is arranged to provide the virtual image toward the first surface, and the first surface is arranged such that the virtual image passed through the first surface propagates into the transparent waveguide.

The image forming device is arranged to face a partial region of the third surface, and the first surface is arranged to reflect the virtual image passed through the third surface.

The display apparatus further includes a projection optical system between the image forming device and the third surface, wherein the curved surface and the projection optical system form: in the first direction, a first principal plane at a first position along an optical axis and a focal plane at a second position along the optical axis; and in the second direction, a second principal plane at a third position different from the first position along the optical axis and the focal plane at the second position along the optical axis.

The transparent waveguide includes: a first surface and a second surface that are arranged to face each other; and a third surface and a fourth surface that are arranged between the first surface and the second surface, wherein the third surface and the fourth surface face each other, wherein the curved surface is formed on the first surface, the third surface and the fourth surface are arranged parallel to each other to have no refractive power, and the image forming device is arranged to provide the virtual image toward the first surface.

The combiner further includes a diffraction pattern arranged in a partial region of the fourth surface to reflect the virtual image toward the third surface.

The diffraction pattern includes a first surface that reflects light corresponding to the virtual image obliquely incident on the first surface in a direction perpendicular to the first surface and a second surface that passes through the light corresponding to the outside environment that is perpendicular incident on the second surface.

The diffraction pattern includes a holographic optical element, a diffractive optical element, or a meta-surface.

The image forming device is arranged to provide the virtual image toward the curved surface, and the display apparatus further includes a projection optical system between the image forming device and the curved surface.

The combiner further includes a transflective coating on the curved surface.

The combiner further includes a light-transmitting plate that supports the transflective coating.

According to another aspect of the disclosure, there is provided a display apparatus including: an image forming device configured to form a virtual image; and a combiner configured to mix the virtual image with light corresponding to an outside environment and provide a viewer with the virtual image and the light that are mixed with each other, wherein the combiner includes: a diffraction pattern including a first surface that reflects light corresponding to the virtual image obliquely incident on the first surface in a direction perpendicular to the first surface and a second surface that passes through the light corresponding to the outside environment that is perpendicular incident on the second surface; and a projection optical system between the image forming device and the diffraction pattern, wherein the diffraction pattern and the projection optical system change a size of the virtual image based on a first magnification in a first direction and a second magnification in a second direction perpendicular to the first direction, the second magnification being less than the first magnification.

The diffraction pattern and the projection optical system: form, in a first direction, a principal plane at a first position along an optical axis and a focal plane at a second position along the optical axis; and form, in a second direction, a principal plane at a third position different from the first position along the optical axis and a focal plane at the second position along the optical axis.

The combiner further includes a light-transmitting plate that supports the diffraction pattern.

According to another aspect of the disclosure, there is provided a display apparatus including: an image forming device configured to form a virtual image; and a combiner configured to: change an aspect ratio of the virtual image based on a first magnification in a first direction and a second magnification in a second direction perpendicular to the first direction, form an augmented image by combining the changed virtual image with light corresponding to an outside environment; provide the augmented image to a viewer, wherein the second magnification is different than the first magnification.

The combiner includes a curved surface that changes the size aspect ratio of the virtual image.

The combiner includes a diffraction pattern that changes the size aspect ratio of the virtual image.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
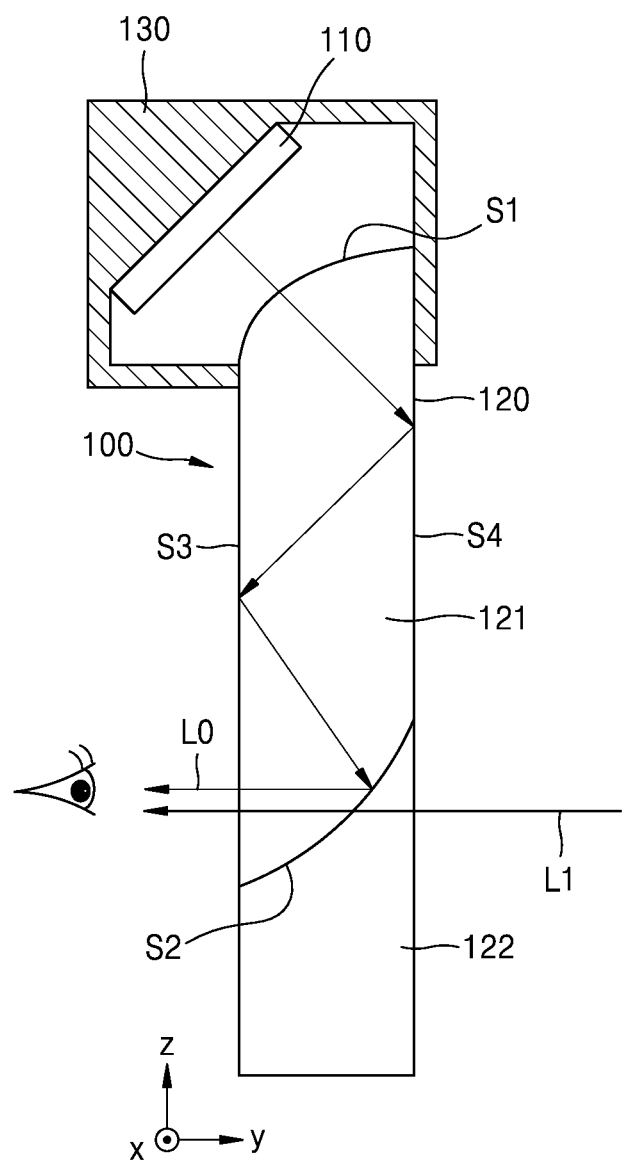
FIG. 1 is a cross-sectional view schematically illustrating a configuration of a display apparatus according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, display apparatuses including combiners having asymmetric magnifications will be described with reference to the accompanying drawings. In the drawings, like reference numerals refer to like elements, and the sizes of elements may be exaggerated for clarity of illustration. In addition, embodiments described herein are for illustrative purposes only, and various modifications may be made therefrom.

In the following description, when an element is referred to as being "above" or "on" another element, it may be directly on the other element while making contact with the other element or may be above the other element without making contact with the other element. The terms of a singular form may include plural forms unless otherwise mentioned. It will be further understood that the terms "comprises" and/or "comprising" used herein specify the presence of stated features or elements, but do not preclude the presence or addition of one or more other features or elements.

An element referred to with the definite article or a demonstrative pronoun may be construed as the element or the elements even though it has a singular form. Operations of a method may be performed in an appropriate order unless explicitly described in terms of order or described to the contrary, and are not limited to the stated order thereof.

In the disclosure, terms such as "unit" or "module" may be used to denote a unit that has at least one function or operation and is implemented with hardware, software, or a combination of hardware and software.

Furthermore, line connections or connection members between elements depicted in the drawings represent functional connections and/or physical or circuit connections by way of example, and in actual applications, they may be replaced or embodied with various additional functional connections, physical connections, or circuit connections.

Examples or example terms are just used herein to describe technical ideas and should not be considered for purposes of limitation unless defined by the claims.

FIG. 1 is a cross-sectional view schematically illustrating a configuration of a display apparatus 10 according to an example embodiment. Referring to FIG. 1, the display apparatus 100 of the example embodiment may include an image forming device 110 configured to form a virtual image, and a combiner 120 configured to mix the virtual image with light containing an outside landscape and provide the mixture to a viewer. According to an example embodiment, the combiner 120 is configured to mix the virtual image with light containing a surrounding environment, and provide the mixture to a viewer. In addition, the display apparatus 100 may further include a case 130 for packaging the image forming device 110, a driving circuit, a power source, an additional optical system, etc. The case 130 may also have a function of fixing the image forming device 110 to the combiner 120.

The image forming device 110 forms a virtual image by modulating light according to image information on the virtual image, and provides the generated virtual image to the viewer. Virtual image formed by the image forming device 110 may be, for example, stereoscopic image which is respectively provided to the left eye and the right eye of the viewer, holographic image, light field image, or integral photography (IP) image, and may include multi-view image or super multi-view image. In addition, the virtual image formed by the image forming device 110 may be, but are not limited thereto, general two-dimensional image.

The image forming device 110 may include, for example, a liquid crystal on silicon (LCoS) device, a liquid crystal display (LCD) device, an organic light emitting diode (OLED) display device, or a digital micromirror device (DMD). In addition, the image forming device 110 may include a next-generation display device such as a micro-LED display device or a quantum dot (QD) LED display device. When the image forming device 110 is a self-emissive display device such as an OLED display device or a micro-LED display device, the image forming device 110 may include only one display panel. However, when the image forming device 110 is a non-emissive display device such as an LCoS device or an LCD device, the image forming device 110 may further include a light source configured to provide illumination light and an optical system configured to adjust the path of illumination light.

The combiner 120 may not only output light L0 containing a virtual image formed by the image forming device 110 to a viewer's eye, but may also output light L1 containing an outside landscape in front of the viewer to the viewer's eye. For example, the combiner 120 may reflect the light L0 containing the virtual image toward the viewer's eye and may transmit the light L1 containing the outside landscape toward the viewer's eye.

According to an example embodiment, the light L1 coming from the outside is not from an artificial image displayed on a separate display panel, but contains an actual foreground existing in front of the viewer. Therefore, the viewer may simultaneously perceive the virtual image artificially generated by the image forming device 110 and the actual foreground. Therefore, the display apparatus 100 may function as a see-through-type display. Furthermore, in this regard, the display apparatus 100 of the example embodiment may be used for implementing augmented reality (AR) or mixed reality (MR). For example, the display apparatus 100 of the example embodiment may be a glasses-type, goggles-type, or head-mounted-type near-eye AR display apparatus.

In addition, the combiner 120 may provide virtual image having a wide viewing angle according to the CinemaScope standard by increasing the size of a virtual image formed by the image forming device 110 to be greater in a first direction (that is, x-direction) than in a second direction (that is, z-direction) perpendicular to the first direction, and may transmit the light L1 containing the outside landscape substantially without distortion. To this end, the combiner 120 may include an optical element having an asymmetric magnification and arranged on the optical path of the light L0 containing the virtual image, and a transparent flat plate arranged on the path of the light L1 containing the outside landscape.

According to an example embodiment, the combiner 120 may include a transparent waveguide 121 configured to guide a virtual image. The transparent waveguide 121 may include a plurality of surfaces, and a curved surface having a freeform shape may be formed on at least one of the plurality of surfaces. As shown in FIG. 1, the transparent waveguide 121 may include a first surface S1 and a second surface S2 which are arranged to face each other in the second direction (z-direction), and a third surface S3 and a fourth surface S4 which are arranged between the first surface S1 and the second surface S2 and face each other in a third direction (y-direction) perpendicular to the first direction (x-direction) and the second direction (z-direction). The curved surface may include a first curved surface formed on the first surface S1 and a second curved surface formed on the second surface S2. The third surface S3 and the fourth surface S4 may be parallel to each other and may thus have no refractive power. According to an example embodiment, the light L0 containing the virtual image may be focused on the viewer's eye by the first curved surface formed on the first surface S1 and the second curved surface formed on the second surface S2. Therefore, the viewer may see the virtual image at a wide viewing angle.

The image forming device 110 may be arranged to provide the light L0 containing the virtual image to the first surface S1 of the transparent waveguide 121. In addition, the case 130 may cover the first surface S1 of the transparent waveguide 121. The image forming device 110 may be fixed such that the image forming device 110 may face the first surface S1 of the transparent waveguide 121 in the case 130. The first surface S1 may be sloped such that the light L0 containing the virtual image and having passed through the first surface S1 may obliquely propagate into the transparent waveguide 121. For example, the center axis of the first surface S1 may be inclined with respect to the third surface S3 and the fourth surface S4. In this case, as shown in FIG. 1, the light L0 containing the virtual image may be obliquely incident on the third surface S3 and the fourth surface S4 inside the transparent waveguide 121.

After the light L0 containing the virtual image enters the inside of the transparent waveguide 121 through the first surface S1, the light L0 containing the virtual image propagates in the transparent waveguide 121 in a negative z-direction while being totally reflected by the third surface S3 and the fourth surface S4. Then, the light L0 containing the virtual image is reflected by the second surface S2 in a negative y-direction and is incident on the viewer's eye through the third surface S3. Here, the negative y-direction and the negative z-direction may refers to a direction opposite to the direction indicated by the arrows in the coordinates illustrated in FIG. 1. The second surface S2 may be sloped such that light reflected from the second surface S2 may be incident on the third surface S3 substantially in a direction perpendicular to the third surface S3. For example, the center axis of the second surface S2 may be inclined with respect to the third surface S3 and the fourth surface S4.

In addition, the combiner 120 may further include a light-transmitting plate 122, wherein the light-transmitting plate 122 may include a surface which is in contact with the second surface S2 of the transparent waveguide 121 and has a shape complementary to the second curved surface formed on the second surface S2, and surfaces which respectively extend continuously from the third surface S3 and the fourth surface S4. Therefore, the light-transmitting plate 122 may share the second surface S2, the third surface S3, and the fourth surface S4 with the transparent waveguide 121. The light L1 containing the outside landscape may be incident on the fourth surface S4 in the negative y-direction and may then be incident on the viewer's eye sequentially through the second surface S2 and the third surface S3.

A transflective coating may be arranged on the second surface S2 to reflect the light L0 containing the virtual image and transmit the light L1 containing the outside landscape. The transflective coating may simply reflect a portion of incident light and transmit the rest of the incident light. In this case, a portion of the light L0 containing the virtual image may be reflected by the transflective coating on the second surface S2 toward the viewer's eye, and a portion of the light L1 containing the outside landscape may pass through the transflective coating on the second surface S2 toward the viewer's eye. When the light L0 containing the virtual image formed by the image forming device 110 is polarized light, the transflective coating may reflect light having a particular polarization component and transmit light having a different polarization component. For example, when the light L0 containing the virtual image has a first polarization component, the transflective coating may reflect light having the first polarization component and transmit light having a second polarization component perpendicular to the first polarization component.

Figure 2:
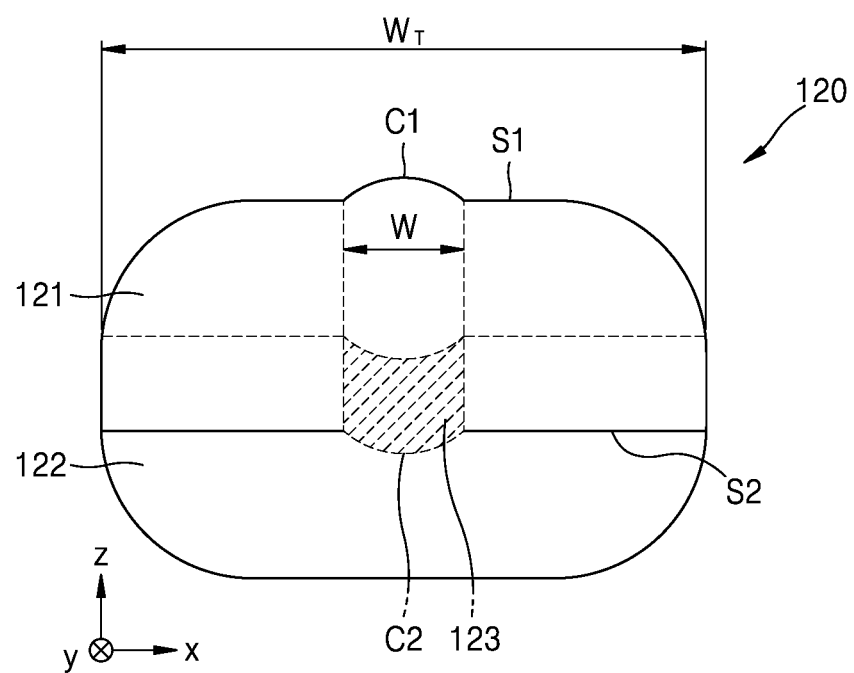
FIG. 2 is a front view schematically illustrating an example structure of a combiner according to an example embodiment.

FIG. 2 is a front view schematically illustrating an example structure of the combiner 120 according to an example embodiment. Referring to FIG. 2, the combiner 120 may have an overall shape similar to the shape of eyeglass lenses when the transparent waveguide 121 and the light-transmitting plate 122 are joined to each other. In this case, a first curved surface C1 may be formed only in a partial region of the first surface S1 which is an optically effective region with respect to the light L0 containing the virtual image, and a second curved surface C2 may be formed only in a partial region of the second surface S2 which is an optically effective region with respect to the light L0 containing the virtual image. In other words, the first curved surface C1 and the second curved surface C2 may be formed on the first surface S1 and the second surface S2 in regions through which the light L0 containing the virtual image passes. The first surface S1 and the second surface S2 may extend in the x-direction, wherein the first curved surface C1 may be formed in a partial region of the first surface S1 in the x-direction, and the second curved surface C2 may be formed in a partial region of the second surface S2 in the x-direction. Therefore, the width W of the first curved surface C1 in the x-direction and the width W of the second curved surface C2 in the x-direction may be less than the overall width $W_T$ of the combiner 120 in the x-direction.

The light L0 containing the virtual image and leaving the image forming device 110 may be incident on the first surface S1 only in the region in which the first curved surface C1 is formed. In addition, the light L0 containing the virtual image may be incident on the second surface S2 only in the region in which the second curved surface C2 is formed. Therefore, a transflective coating 123, which reflects the light L0 containing the virtual image toward the viewer, may not be formed on the entirety of the second surface S2 but may be formed only on the second curved surface C2.

The size and aspect ratio of a virtual image, which reaches the viewer's eye, may be determined by the geometric shapes of the first curved surface C1 and the second curved surface C2. The first curved surface C1 and the second curved surface C2 may have asymmetrical magnifications to provide a virtual image having a wide viewing angle according to the CinemaScope standard by increasing the viewing angle in a horizontal direction, that is, the x-direction. In other words, the first curved surface C1 and the second curved surface C2 may have asymmetric shapes such that the size of a virtual image may be adjusted with a first magnification in the horizontal direction, that is, the x-direction and a second magnification in a vertical direction, that is, in the z-direction, wherein the second magnification is less than the first magnification. According to an example embodiment, the second magnification may be different from the first magnification.

Figure 3:
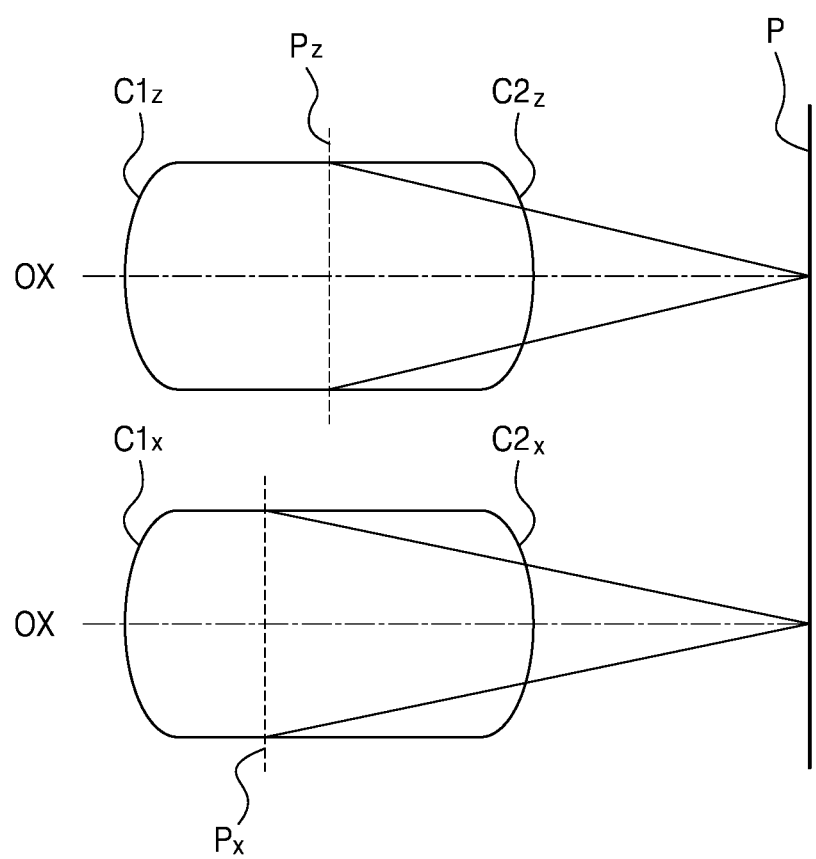
FIG. 3 is an example view illustrating principal planes and a focal plane of an optical system which are equivalent to curved surfaces of the combiner shown in FIG. 2.

FIG. 3 is an example view illustrating principal planes and a focal plane of an optical system which are equivalent to the first and second curved surfaces C1 and C2 of the combiner 120 shown in FIG. 2. In the combiner 120 shown in FIGS. 1 and 2, the first curved surface C1 and the second curved surface C2 are sloped, and the optical axis of the first curved surface C1 and the optical axis of the second curved surface C2 do not coincide with each other in order to combine the light L0 containing the virtual image with the light L1 containing the outside landscape. However, it is possible to set up an equivalent optical system having curved surfaces, which face each other along a common optical axis while serving as optical equivalents to the first curved surface C1 and the second curved surface C2 for the light L0 containing the virtual image. Hereinafter, for ease of description, the curved surfaces of the equivalent optical system will be described as the first and second curved surfaces C1 and C2 of the combiner 120.

Referring to FIG. 3, each of the first curved surface C1 and the second curved surface C2 may have different curved shapes in the x-direction and the z-direction. In other words, the x-direction curve component C1$x$ of the first curved surface C1 may have a shape different from the shape of the z-direction curve component C1$z$ of the first curved surface C1, and the x-direction curve component C2$x$ of the second curved surface C2 may have a shape different from the shape the z-direction curve component C2$z$ of the second curved surface C2. Here, the x-direction curve components C1$x$ and C2$x$ respectively refer to a cross-section of the first curved surface C1 and a cross-section of the second curved surface C2 that are taken along a plane which is parallel to the x-direction and perpendicular to the z-direction among planes containing an optical axis OX, and each of the x-direction curve components C1$x$ and C2$x$ refracts incident light in the x-direction. In addition, the z-direction curve components C1$z$ and C2$z$ respectively refer to a cross-section of the first curved surface C1 and a cross-section of the second curved surface C2 that are taken along a plane which is parallel to the z-direction and perpendicular to the x-direction among planes containing an optical axis OX, and each of the z-direction curve components C1$z$ and C2$z$ refracts incident light in the z-direction.

Therefore, the first magnification in the x-direction may be determined by the shape of the x-direction curve component C1$x$ of the first curved surface C1 and the shape of the x-direction curve component C2$x$ of the second curved surface C2, and the second magnification in the z-direction may be determined by the shape of the z-direction curve component C1$z$ of the first curved surface C1 and the z-direction curve component C2$z$ of the second curved surface C2. In general, the magnification of an optical system may be determined by the effective focal length of the optical system. However, when the position of the focal plane of the optical system is different in the x-direction and the z-direction, the position at which the viewer may clearly see the virtual image is different in the x-direction and the z-direction.

According to an example embodiment, the first curved surface C1 and the second curved surface C2 are provided such that the position of a principal plane is different in the x-direction and the z-direction. The term "principal plane" refers to an imaginary refractive plane at which parallel rays incident on a lens appear to begin to be refracted. As shown in FIG. 3, the position of a principal plane Px in the x-direction and the position of a principal plane Pz in the z-direction may be different from each other along the optical axis OX. However, the position of a focal plane P in the x-direction and the position of a focal plane P in the z-direction may be the same along the optical axis OX. In this case, the effective focal length, that is, magnification, may be different in the x-direction and the z-direction, and the image plane of the virtual image in the x-direction may coincide with the image plane of the virtual image in the z-direction. The position of the principal plane Px and the position of the focal plane P in the x-direction may be determined by the shapes of the x-direction curve components C1$x$ and C2$x$, and the position of the principal plane Pz and the position of the focal plane P in the z-direction may be determined by the shapes of the z-direction curve components C1$z$ and C2$z$.

Figure 4:
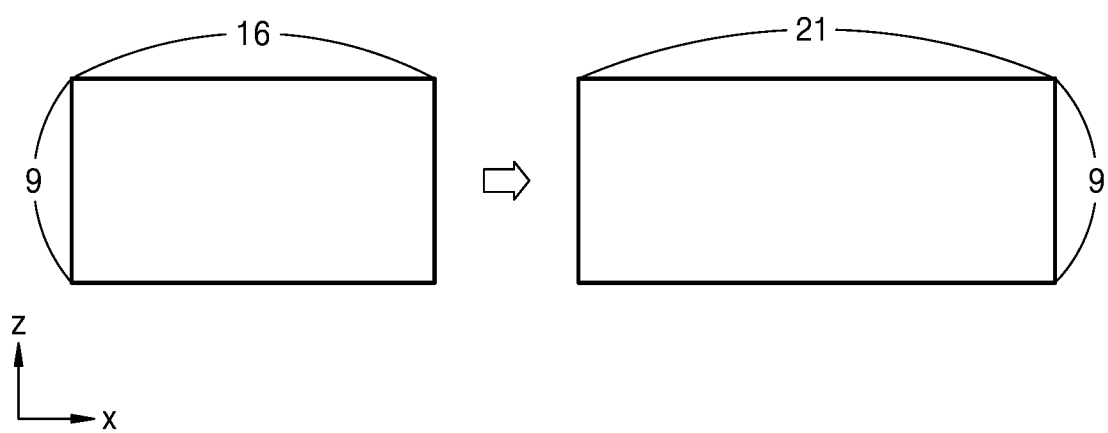
FIG. 4 is a view illustrating an example in which the aspect ratio of a virtual image is increased by the combiner shown in FIG. 2.

As described above, the combiner 120 may increase the aspect ratio of the virtual image and increase the viewing angle of the virtual image in the x-direction by using the first curved surface C1 and the second curved surface C2 which have different cross-sectional shapes in the x-direction and the z-direction to have the principal planes Px and Pz at different positions in the x-direction and the z-direction and the focal plane P at the same position in the x-direction and z-direction. For example, FIG. 4 is a view illustrating an example in which the aspect ratio of the virtual image is increased by the combiner 120 shown in FIG. 2. Referring to FIG. 4, when the image forming device 110 forms a virtual image having an aspect ratio of, for example, 16:9, the virtual image may be shown to the viewer through the combiner 120 as having an aspect ratio of 21:9 in accordance with the CinemaScope standard. The image forming device 110 may form a virtual image compressed in the x-direction by considering the degree to which the virtual image will be magnified in the x-direction. Then, the virtual image may be shown to the viewer as having a normal aspect ratio. Although FIG. 4 shows that the combiner 120 varies the aspect ratio of the virtual image from 16:9 to 21:9, this is merely a non-limiting example. The aspect ratio of the virtual image formed by the image forming device 110 and the aspect ratio of the virtual image shown to the viewer through the combiner 120 may be differently selected according to the design of the display apparatus 100.

According to an example embodiment, instead of forming a plurality of complex curved surfaces on the combiner 120, the first curved surface C1 and the second curved surface C1, which are asymmetric to each other, are formed only on the first surface S1 and the second surface S2 of the combiner 120, which face each other, thereby reducing the thickness of the combiner 120. For example, the first curved surface C1 and the second curved surface C2 may be formed on the combiner 120 even when the combiner 120 has a small thickness of about 3 mm to about 6 mm. Therefore, virtual image having a wide viewing angle and a large aspect ratio may be provided using the thin combiner 120 having a small thickness. In addition, the size and weight of the display apparatus 100 including the combiner 120 may also be reduced.

Figure 5:
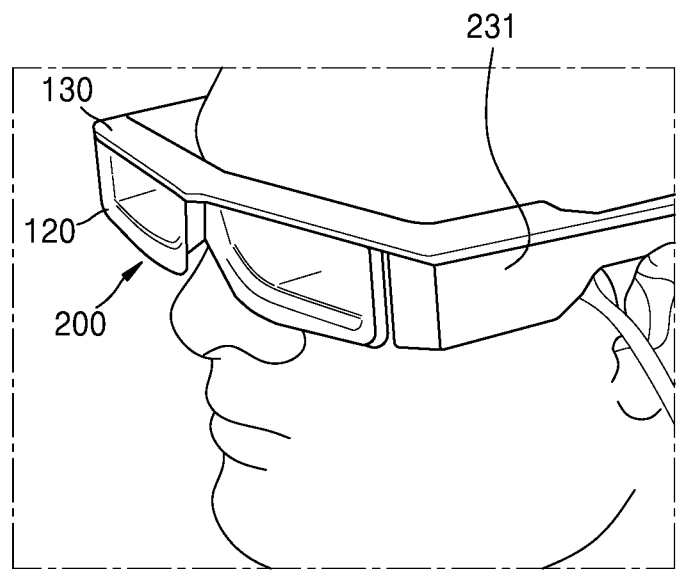
FIG. 5 is a view illustrating an example of an electronic device employing a display apparatus according to an example embodiment.

As described above, the display apparatus 100 may be used to implement AR or MR. For example, FIG. 5 is a view illustrating an example in which an electronic device 200 employs the display apparatus 100 according to an example embodiment. Referring to FIG. 5, for example, the electronic device 200 may be a wearable device, a head mounted display (HMD), a glasses-type display, or a goggles-type display. The electronic device 200 may be operated in connection with a smartphone. The electronic device 200 may be a virtual reality (VR), AR, or MR display of a head mounted type, a glasses type, or a goggles type which is capable of providing VR or a mixture of virtual image and real outside image.

In particular, when the electronic device 200 is a glasses-type near-eye display or a goggles-type near-eye display, the combiner 120 may be positioned in front of a viewer's eye to serve as a screen of glasses, and the case 130 may serve as a glasses frame to support the combiner 120. The case 130 may extend to a temple 231 of the glasses. A control circuit including an image processing processor or the like may be arranged in the temple 231. The electronic device 200 may include two display apparatuses 100 configured to be respectively arranged in front of the left and right eyes of a viewer, or may include only one display apparatus 100 configured to be arranged in front of one of the left and right eyes of a viewer.

Figure 6:
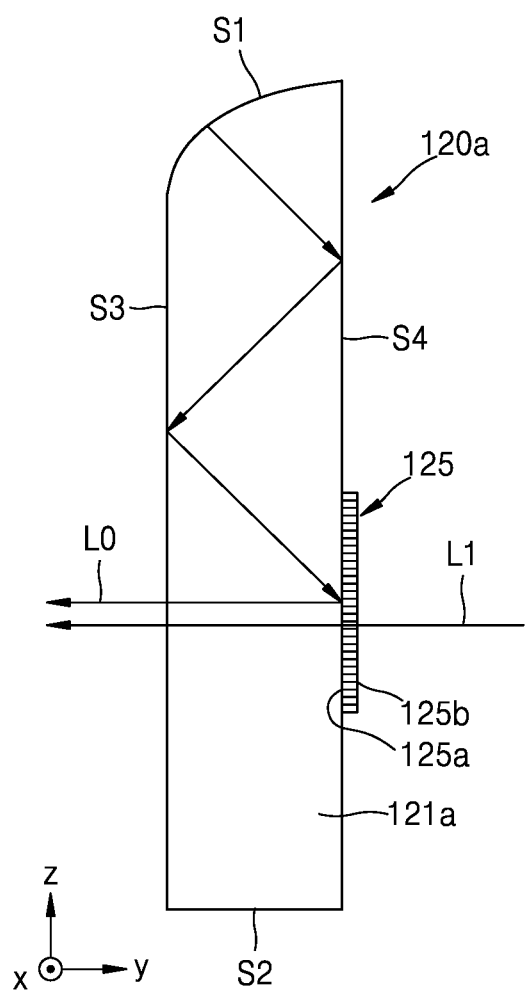
FIG. 6 is a cross-sectional view schematically illustrating an example structure of a combiner according to another example embodiment.

According to another example embodiment, among the first curved surface C1 and the second curved surface C2 of the combiner 120, the second curved surface C2 may be replaced with a diffraction pattern having the same optical function as the second curved surface C2. In this case, the light-transmitting plate 122 may be omitted, and the combiner 120 may include only the transparent waveguide 121. For example, FIG. 6 is a cross-sectional view schematically illustrating an example structure of a combiner 120a according to another example embodiment. Referring to FIG. 6, the combiner 120a may include a transparent waveguide 121a and a diffraction pattern 125. The transparent waveguide 121a may include a first surface S1 and a second surface S2 which are arranged to face each other, and a third surface S3 and a fourth surface S4 which are arranged between the first surface S1 and the second surface S2 and face each other. A curved surface may be formed only on the first surface S1, and the third surface S3 and the fourth surface S4 may be arranged parallel to each other to have no refractive power.

The diffraction pattern 125 may be arranged in a partial region of the fourth surface S4 of the transparent waveguide 121a. Light L0 containing a virtual image may enter the transparent waveguide 121a through the first surface S1, and may then propagate inside the transparent waveguide 121a while being totally internally reflected by the third surface S3 and the fourth surface S4. Thereafter, the light L0 containing the virtual image may be incident on the diffraction pattern 125 arranged on the fourth surface S4.

The diffraction pattern 125 may be configured such that the light L0 containing the virtual image and obliquely incident on diffraction pattern 125 may be reflected toward the third surface S3 while being focused. In particular, the diffraction pattern 125 may be configured to provide the same optical effect as the second curved surface C2. In addition, the diffraction pattern 125 may simply serve as a transparent flat plate for light L1 containing an outside landscape. To this end, the diffraction pattern 125 may include a first surface 125a that reflects obliquely incident light in a perpendicular direction, and a second surface 125b that is opposite the first surface 125a and transmits perpendicularly incident light. The first surface 125a of the diffraction pattern 125 may be arranged in direct contact with the fourth surface S4 of the transparent waveguide 121a.

The diffraction pattern 125 may include a diffractive optical element (DOE), a holographic optical element (HOE), or a meta-surface. The DOE may include a plurality of periodic fine grating patterns. The grating patterns of the DOE act as a diffraction grating which diffracts incident light. In particular, according to the size, height, period, etc. of the grating patterns, light incident within a predetermined angle range may be diffracted and subjected to destructive interference and constructive interference, and thus, the propagation direction of the light may be changed while the light being focused. The HOE may include periodic fine patterns of materials having different refractive indexes instead of including grating patterns. The HOE may be different only in structure from the DOE and may have the same operating principle as the DOE. Or, the diffraction pattern 125 may include a meta-surface. The meta-surface may include nanoscale patterns having a higher refractive index than surroundings thereof and a size smaller than the wavelength of incident light. According to the size, height, period, distribution, refractive index, etc. of the nanoscale patterns, the meta-surface may have a given optical effect.

Because the diffraction pattern 125 has the same optical effect on the light L0 containing the virtual image as the second curved surface C2, the curved surface, which is formed on the first surface S1, and the diffraction pattern 125 may form an optical system having the same function as the optical system described with reference to FIG. 3. For instance, the diffraction pattern 125 may vary a size of the virtual image with a first magnification in a first direction and a second magnification in a second direction perpendicular to the first direction. The second magnification may be different from the first magnification. The second magnification may be less than the first magnification. Therefore, the description of the optical function of the combiner 120 shown in FIG. 1 may be applied to the combiner 120a shown in FIG. 6.

Figure 7:
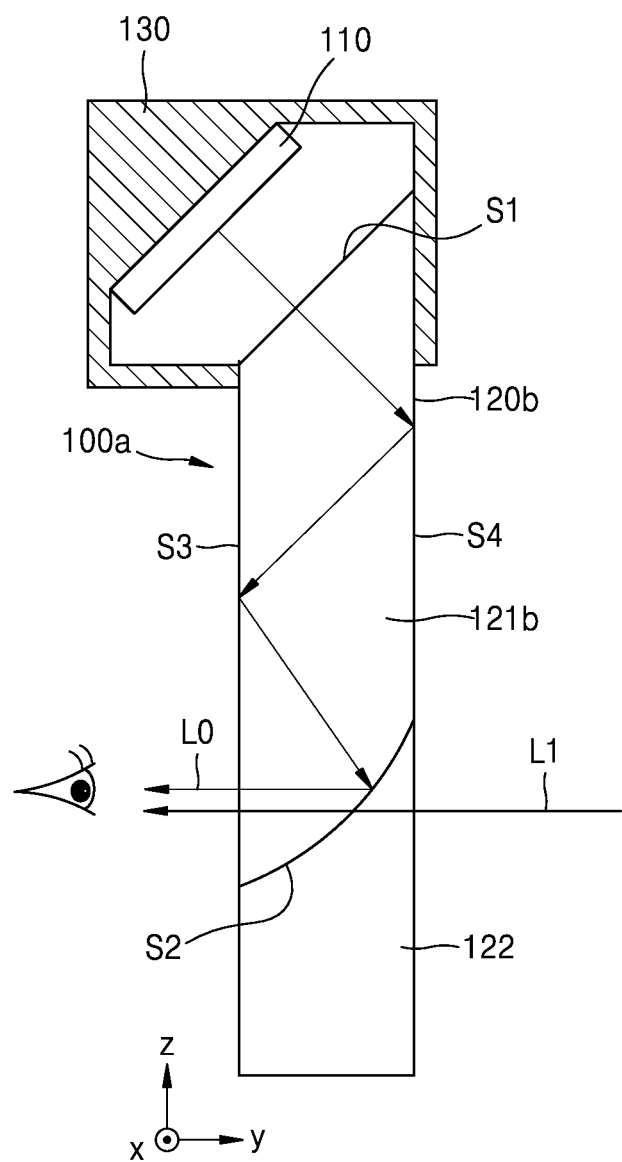
FIG. 7 is a cross-sectional view schematically illustrating a configuration of a display apparatus according to another example embodiment.

FIG. 7 is a cross-sectional view schematically illustrating a configuration of a display apparatus 100a according to another example embodiment. Referring to FIG. 7, the display apparatus 100a may include an image forming device 110, a combiner 120b, and a case 130. The combiner 120b may include a transparent waveguide 121b and a light-transmitting plate 122. The transparent waveguide 121b may include a first surface S1 and a second surface S2 which are arranged to face each other, and a third surface S3 and a fourth surface S4 which are arranged between the first surface S1 and the second surface S2 and face each other. A curved surface may be formed only on the second surface S2, and the third surface S3 and the fourth surface S4 may be arranged parallel to each other to have no refractive power. The first surface S1 may have a flat shape having no refractive power. In addition, the first surface S1 may be an inclined flat surface that transmits light L0 containing a virtual image such that the L0 containing the virtual image may obliquely propagate in the transparent waveguide 121b. The image forming device 110, the case 130, and the light-transmitting plate 122 are the same as those described with reference to FIG. 1, and thus descriptions thereof may not be presented here.

The combiner 120b shown in FIG. 7 may increase the aspect ratio of the light L0 containing the virtual image by using only the curved surface formed on the second surface S2 of the transparent waveguide 121b. In this case, the position of the image plane of the virtual image which is focused on the eye of a viewer by the curved surface may be different in the x-direction and the z-direction. The difference between the x-direction magnification and the z-direction magnification of the curved surface may be small such that the viewer may not perceive the difference between the position of the image plane in the x-direction and the position of the image plane in the z-direction. For example, the x-direction magnification of the curved surface formed on the second surface S2 of the transparent waveguide 121b may be about 1.05 times to about 1.15 times the z-direction magnification of the curved surface formed on the second surface S2 of the transparent waveguide 121b. The combiner 120b shown in FIG. 7 may be easily manufactured and may incur low design costs.

Figure 8:
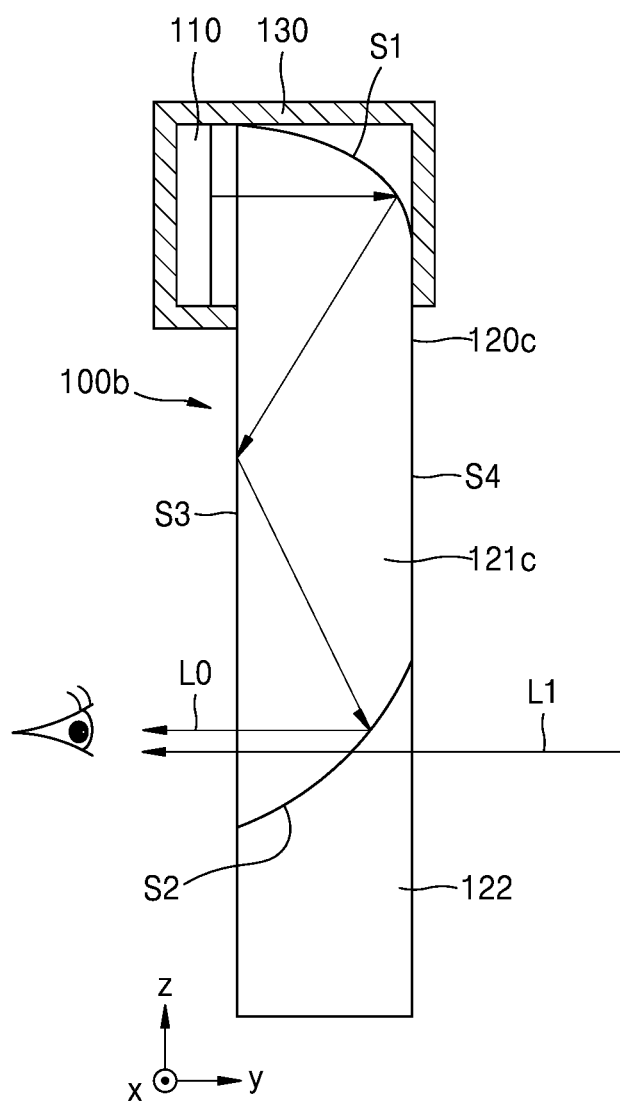
FIG. 8 is a cross-sectional view schematically illustrating a configuration of a display apparatus according to another example embodiment.

FIG. 8 is a cross-sectional view schematically illustrating a configuration of a display apparatus 100b according to another example embodiment. Referring to FIG. 8, the display apparatus 100b may include an image forming device 110, a combiner 120c, and a case 130. The combiner 120c may include a transparent waveguide 121c and a light-transmitting plate 122. The transparent waveguide 121c may include a first surface S1 and a second surface S2 which are arranged to face each other, and a third surface S3 and a fourth surface S4 which are arranged between the first surface S1 and the second surface S2 and face each other. Curved surfaces for focusing light L0 containing a virtual image may be respectively formed on the first surface S1 and the second surface S2, and the third surface S3 and the fourth surface S4 may be arranged parallel to each other.

The image forming device 110 may be arranged to face a partial region of the third surface S3. For example, the image forming device 110 may be arranged to face an upper region of the third surface S3. Although FIG. 8 shows that a gap is formed between the image forming device 110 and the third surface S3, the image forming device 110 may be arranged in close contact with the third surface S3. The light L0 containing the virtual image and formed by the image forming device 110 may pass through the third surface S3 and reach the first surface S1 in a positive y-direction. Thereafter, the light L0 containing the virtual image may be obliquely reflected by the first surface S1. To this end, a reflective coating may be formed on the first surface S1. Therefore, the curved surface formed on the first surface S1 may be a concave reflective surface. The reflective surface of the first surface S1 may be sloped toward the third surface S3.

Figure 9:
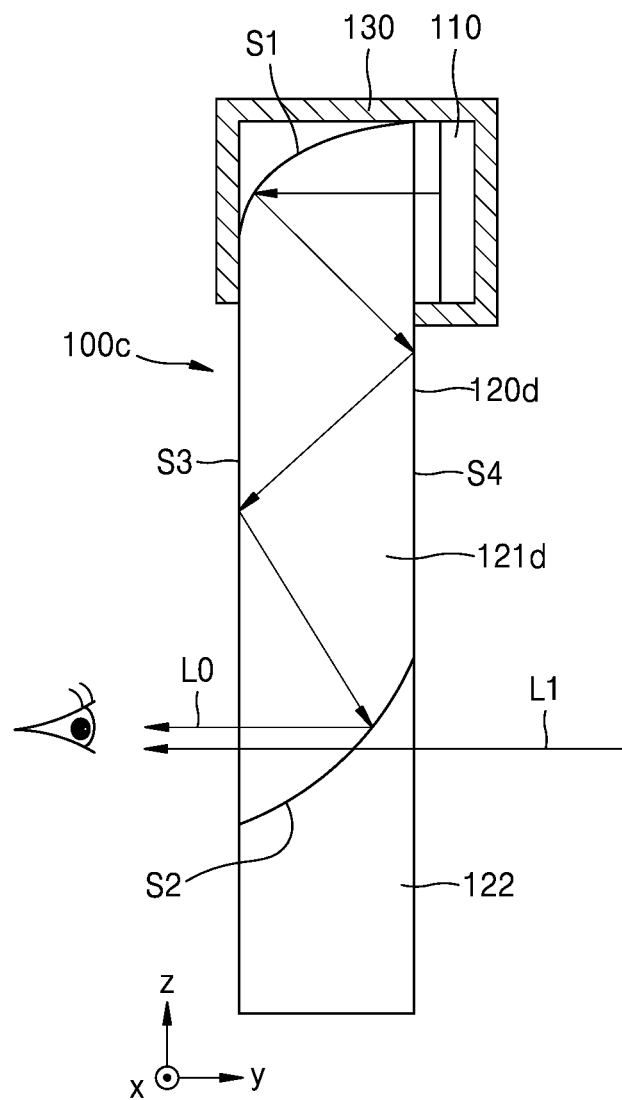
FIG. 9 is a cross-sectional view schematically illustrating a configuration of a display apparatus according to another example embodiment.

FIG. 9 is a cross-sectional view schematically illustrating a configuration of a display apparatus 100c according to another example embodiment. The display apparatus 100c shown in FIG. 9 has a configuration similar to that of the display apparatus 100b shown in FIG. 8 except that the position of an image forming device 110 is different and a first surface S1 of a transparent waveguide 121d of a combiner 120d is left-right reversed compared to the first surface S1 of the transparent waveguide 121c shown in FIG. 8. The image forming device 110 may be arranged to face an upper region of a fourth surface S4 of the transparent waveguide 121d. In this case, light L0 containing a virtual image and formed by the image forming device 110 may pass through the fourth surface S4 and reach the first surface S1 in the negative y-direction. A reflective surface of the first surface S1 may be sloped toward the fourth surface S4.

Figure 10:
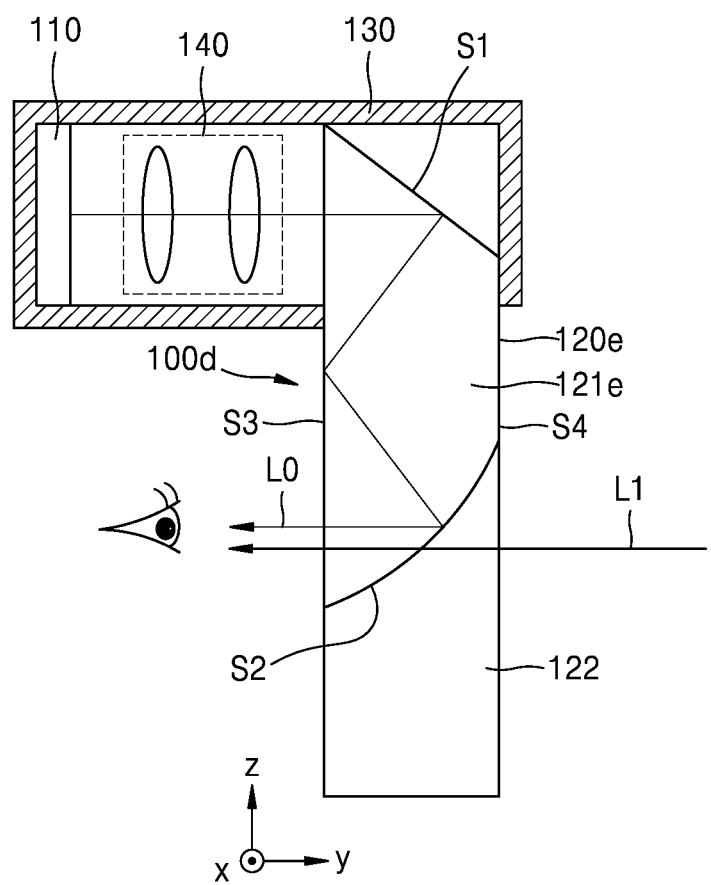
FIG. 10 is a cross-sectional view schematically illustrating a configuration of a display apparatus according to another example embodiment.

FIG. 10 is a cross-sectional view schematically illustrating a configuration of a display apparatus 100d according to another example embodiment. Referring to FIG. 10, the display apparatus 100d may include an image forming device 110, a projection optical system 140, a combiner 120e, and a case 130. The projection optical system 140 may be arranged between the image forming device 110 and the combiner 120e and may be accommodated in the case 130 together with the image forming device 110.

The combiner 120e may include a transparent waveguide 121e and a light-transmitting plate 122. A curved surface is formed on a second surface S2 of the transparent waveguide 121e, and a third surface S3 and a fourth surface S4 of the transparent waveguide 121e may be arranged parallel to each other. The first surface S1 of the transparent waveguide 121e may be a flat surface having no refractive power and inclined toward the third surface S3.

The image forming device 110 and the projection optical system 140 may be arranged to face an upper region of the third surface S3. Light L0 containing a virtual image and formed by the image forming device 110 may pass through the third surface S3 and reach the first surface S1 in the positive y-direction. Then, the light L0 containing the virtual image may be obliquely reflected by the first surface S1. To this end, a reflective coating may be formed on the first surface S1 of the transparent waveguide 121e.

The projection optical system 140 may have a function of increasing the aspect ratio of the virtual image together with the curved surface formed on the second surface S2 of the transparent waveguide 121e. In other words, the projection optical system 140 may have the same function as the first curved surface C1 shown in FIG. 2. Therefore, the projection optical system 140 and the curved surface formed on the second surface S2 of the transparent waveguide 121e may form an optical system having the same function as the optical system described with reference to FIG. 3. The projection optical system 140 may include a plurality of lens elements to compensate for image distortion or aberration.

The example embodiments shown in FIGS. 7 to 10 may be combined with the example embodiment shown in FIG. 6. For example, each of the curved surfaces formed on the second surfaces S2 of the transparent waveguides 121b, 121c, 121d, and 121e shown in FIGS. 7 to 10 may be replaced with the diffraction pattern 125 shown in FIG. 6.

Figure 11:
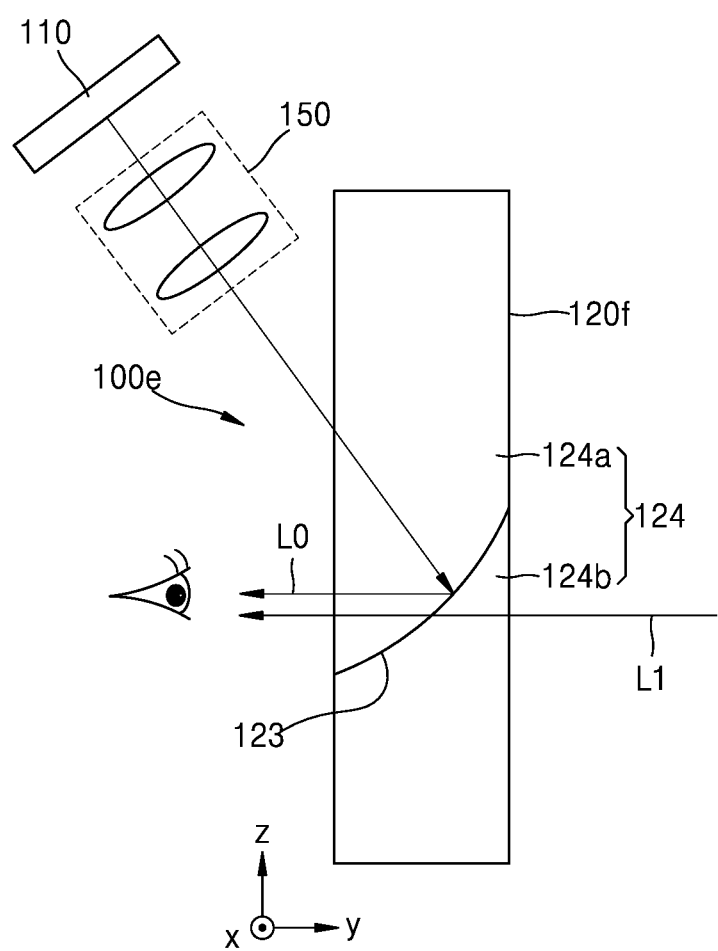
FIG. 11 is a cross-sectional view schematically illustrating a configuration of a display apparatus according to another example embodiment.

Each of the combiners 120, 120a, 120b, 120c, 120d, and 120e described above includes a transparent waveguide of a total reflection type. However, a virtual image may be transmitted through air without using a transparent waveguide. For example, FIG. 11 is a cross-sectional view schematically illustrating a configuration of a display apparatus 100e according to another example embodiment. Referring to FIG. 11, the display apparatus 100e may include an image forming device 110, a projection optical system 150, and a combiner 120f. The combiner 120f may include a transflective coating 123 having a curved surface. The combiner 120f may further include a light-transmitting plate 124 which supports and fixes the transflective coating 123. The light-transmitting plate 124 may include a first portion 124a and a second portion 124b which are bonded to each other. The transflective coating 123 may be arranged on bonded surfaces between the first portion 124a and the second portion 124b of the light-transmitting plate 124. The bonded surfaces between the first portion 124a and the second portion 124b of the light-transmitting plate 124 may have complementary curved surfaces.

The projection optical system 150 may be arranged to provide light L0 containing a virtual image directly to the transflective coating 123. For ease of illustration, FIG. 11 shows that the image forming device 110 sends light directly to the projection optical system 150, but an additional relay optical system may be arranged between the image forming device 110 and the projection optical system 150. Because the virtual image is projected into air through the projection optical system 150, the degree of freedom of the position of the image forming device 110 may increase.

The projection optical system 150 and the curved surface of the transflective coating 123 may together serve to increase the aspect ratio of the virtual image. In other words, the projection optical system 150 may have the same function as the first curved surface C1 shown in FIG. 2, and the curved surface of the transflective coating 123 may have the same function as the second curved surface C2 shown in FIG. 2. The projection optical system 150 and the curved surface of the transflective coating 123 may form an optical system having the same function as the optical system described with reference to FIG. 3.

Figure 12:
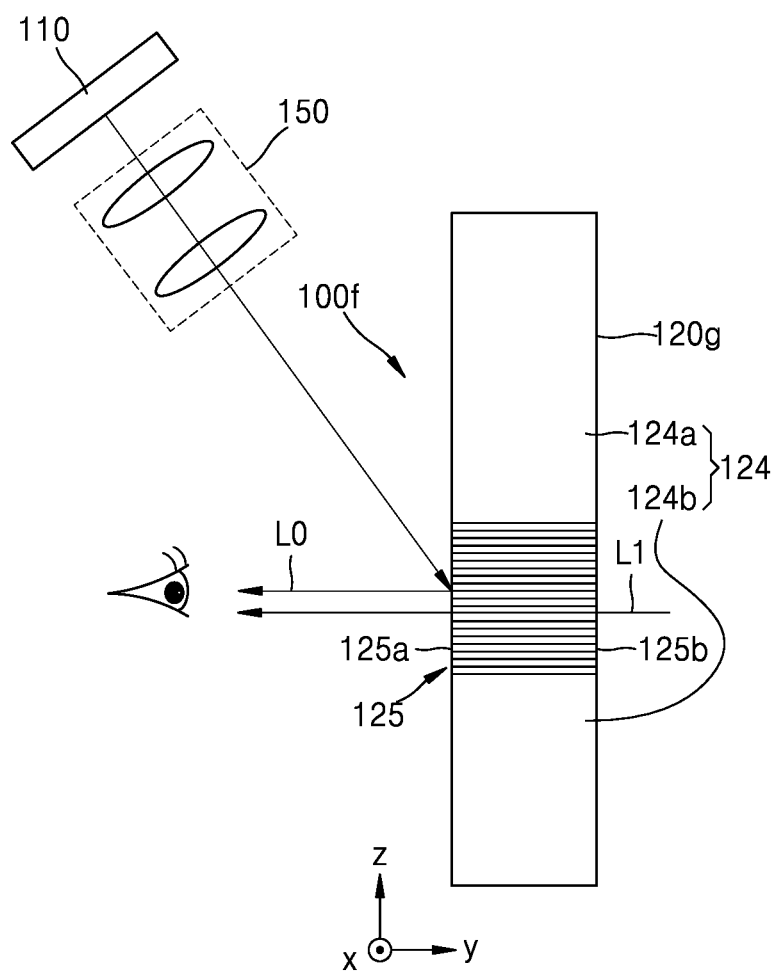
FIG. 12 is a cross-sectional view schematically illustrating a configuration of a display apparatus according to another example embodiment.

The transflective coating 123 shown in FIG. 11 may be replaced with a diffraction pattern. For example, FIG. 12 is a cross-sectional view schematically illustrating a configuration of a display apparatus 100f according to another example embodiment. Referring to FIG. 12, a combiner 120g of the display apparatus 100f may include a diffraction pattern 125 instead of the transflective coating 123. In addition, the combiner 120g may further include a light-transmitting plate 124 which supports and fixes the diffraction pattern 125. The light-transmitting plate 124 may include a first portion 124a and a second portion 124b, and the diffraction pattern 125 may be fixed between the first portion 124a and the second portion 124b of the light-transmitting plate 124.

A projection optical system 150 may be arranged to provide light L0 containing a virtual image directly to the diffraction pattern 125. The diffraction pattern 125 may be configured such that the light L0 containing the virtual image, which is obliquely incident on the diffraction pattern 125 from the projection optical system 150, may be reflected and focused onto an eye of a viewer. In addition, the diffraction pattern 125 may function as a transparent flat plate for light L1 containing an outside landscape. The configuration and operation of the diffraction pattern 125 may be the same as those of the diffraction pattern 125 described with reference to FIG. 6. In addition, the projection optical system 150 and the diffraction pattern 125 may form an optical system having the same function as the optical system described with reference to FIG. 3.

Figure 13:
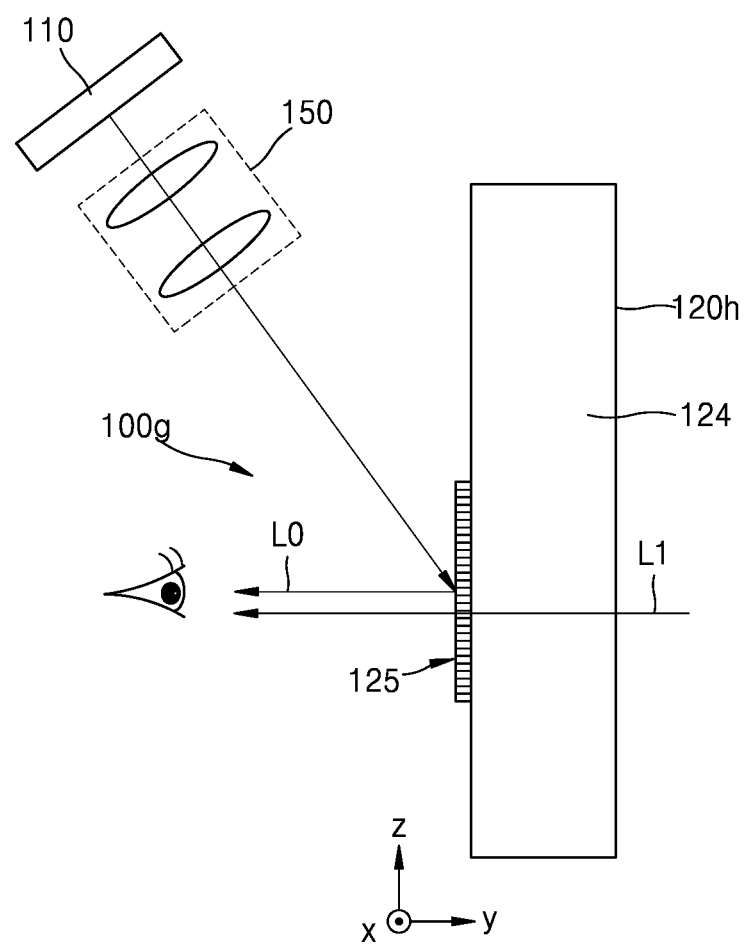
FIG. 13 is a cross-sectional view schematically illustrating a configuration of a display apparatus according to another example embodiment.

FIG. 13 is a cross-sectional view schematically illustrating a configuration of a display apparatus 100g according to another example embodiment. Referring to FIG. 13, a combiner 120h of the display apparatus 100g may include a diffraction pattern 125 and a light-transmitting plate 124 which supports and fixes the diffraction pattern 125. Unlike in the example embodiment shown in FIG. 12, the light-transmitting plate 124 shown in FIG. 13 is a single one-piece flat plate, and the diffraction pattern 125 may be attached to a surface of the light-transmitting plate 124. Except for this, the display apparatus 100g may have the same structure and operation as the display apparatus 100f shown in FIG. 12.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
an image forming device configured to form a virtual image; and
a combiner configured to mix the virtual image with light corresponding to an outside environment and provide a viewer with the virtual image and the light that are mixed with each other,
wherein the combiner comprises a curved surface that changes a size of the virtual image based on a first magnification in a first direction and a second magnification in a second direction perpendicular to the first direction, the second magnification being less than the first magnification, and
wherein the combiner comprises a transparent waveguide configured to transmit the virtual image, and the curved surface is provided on a surface of the transparent waveguide.

2. The display apparatus of claim 1,
wherein the transparent waveguide comprises:
a first surface and a second surface that are arranged to face each other; and
a third surface and a fourth surface that are arranged between the first surface and the second surface,
wherein the third surface and the fourth surface face each other,
wherein the curved surface comprises a first curved surface formed on the first surface and a second curved surface formed on the second surface, and
wherein the third surface and the fourth surface are arranged parallel to each other to have no refractive power.

3. The display apparatus of claim 2,
wherein the first curved surface and the second curved surface form:
in a first direction, a first principal plane at a first position along an optical axis and a first focal plane at a second position along the optical axis; and
in a second direction, a second principal plane at a third position different from the first position along the optical axis and the focal plane at the second position along the optical axis.

4. The display apparatus of claim 2,
wherein each of the first curved surface and the second curved surface has a width in the first direction which is less than an overall width of the combiner in the first direction.

5. The display apparatus of claim 2,
wherein the image forming device is arranged to provide the virtual image toward the first surface, and the first surface is arranged such that the virtual image passed through the first surface propagates into the transparent waveguide.

6. The display apparatus of claim 2,
wherein the image forming device is arranged to face a partial region of the third surface, and the first surface is arranged to reflect the virtual image passed through the third surface.

7. The display apparatus of claim 2,
wherein the image forming device is arranged to face a partial region of the fourth surface, and the first surface is arranged to reflect the virtual image passed through the fourth surface.

8. The display apparatus of claim 2,
wherein the combiner further comprises a light-transmitting plate, the light-transmitting plate comprising:
a fifth surface that is in contact with the second surface and has a shape complementary to the second curved surface formed on the second surface;
a sixth surface that extends from the third surface; and
a seventh surface that extends from the fourth surface.

9. The display apparatus of claim 8,
wherein the combiner further comprises a transflective coating on the second surface.

10. The display apparatus of claim 1,
wherein the transparent waveguide comprises: a first surface and a second surface that are arranged to face each other; and a third surface and a fourth surface that are arranged between the first surface and the second surface,
wherein the third surface and the fourth surface face each other, and
wherein the first surface is an inclined flat surface, the curved surface is formed on the second surface, and the third surface and the fourth surface are arranged parallel to each other to have no refractive power.

11. The display apparatus of claim 10,
wherein the combiner further comprises a light-transmitting plate, the light-transmitting plate comprising:
a fifth surface that is in contact with the curved surface and has a shape complementary to the curved surface;
a sixth surface that extends from the third surface, and
a seventh surface that extends from the fourth surface.

12. The display apparatus of claim 10,
wherein the image forming device is arranged to provide the virtual image toward the first surface, and the first surface is arranged such that the virtual image passed through the first surface propagates into the transparent waveguide.

13. The display apparatus of claim 10,
wherein the image forming device is arranged to face a partial region of the third surface, and the first surface is arranged to reflect the virtual image passed through the third surface.

14. The display apparatus of claim 13, further comprising a projection optical system between the image forming device and the third surface,
wherein the curved surface and the projection optical system form:
in the first direction, a first principal plane at a first position along an optical axis and a focal plane at a second position along the optical axis; and
in the second direction, a second principal plane at a third position different from the first position along the optical axis and the focal plane at the second position along the optical axis.

15. The display apparatus of claim 1,
wherein the transparent waveguide comprises: a first surface and a second surface that are arranged to face each other; and a third surface and a fourth surface that are arranged between the first surface and the second surface,
wherein the third surface and the fourth surface face each other,
wherein the curved surface is formed on the first surface, the third surface and the fourth surface are arranged parallel to each other to have no refractive power, and the image forming device is arranged to provide the virtual image toward the first surface.

16. The display apparatus of claim 15,
wherein the combiner further comprises a diffraction pattern arranged in a partial region of the fourth surface to reflect the virtual image toward the third surface.

17. The display apparatus of claim 16,
wherein the diffraction pattern comprises a first surface that reflects light corresponding to the virtual image obliquely incident on the first surface in a direction perpendicular to the first surface and a second surface that passes through the light corresponding to the outside environment that is perpendicular incident on the second surface.

18. The display apparatus of claim 16,
wherein the diffraction pattern comprises a holographic optical element, a diffractive optical element, or a meta-surface.

19. The display apparatus of claim 1,
wherein the image forming device is arranged to provide the virtual image toward the curved surface, and the display apparatus further comprises a projection optical system between the image forming device and the curved surface.

20. The display apparatus of claim 19,
wherein the combiner further comprises a transflective coating on the curved surface.

21. The display apparatus of claim 19,
wherein the combiner further comprises a light-transmitting plate that supports the transflective coating.

22. A display apparatus comprising:
an image forming device configured to form a virtual image; and
a combiner configured to mix the virtual image with light corresponding to an outside environment and provide a viewer with the virtual image and the light that are mixed with each other,
wherein the combiner comprises:
a diffraction pattern comprising a first surface that reflects light corresponding to the virtual image obliquely incident on the first surface in a direction perpendicular to the first surface and a second surface that passes through the light corresponding to the outside environment that is perpendicular incident on the second surface; and
a projection optical system between the image forming device and the diffraction pattern,
wherein the diffraction pattern and the projection optical system change a size of the virtual image based on a first magnification in a first direction and a second magnification in a second direction perpendicular to the first direction, the second magnification being less than the first magnification, and
wherein the combiner further comprises a light-transmitting plate that supports the diffraction pattern.

23. The display apparatus of claim 22,
wherein the diffraction pattern and the projection optical system:
form, in a first direction, a principal plane at a first position along an optical axis and a focal plane at a second position along the optical axis; and
form, in a second direction, a principal plane at a third position different from the first position along the optical axis and a focal plane at the second position along the optical axis.

24. A display apparatus comprising:
an image forming device configured to form a virtual image; and
a combiner configured to:
change an aspect ratio of the virtual image based on a first magnification in a first direction and a second magnification in a second direction perpendicular to the first direction,
form an augmented image by combining the changed virtual image with light corresponding to an outside environment;
provide the augmented image to a viewer,
wherein the second magnification is different than the first magnification, and
wherein the combiner comprises a transparent waveguide configured to transmit the virtual image and a curved surface that changes the size aspect ratio of the virtual image, the curved surface being provided on a surface of the transparent waveguide.

* * * * *